Jan. 11, 1966   T. W. BUNYAN   3,228,482
PROPELLER HUB AND SHAFT CONNECTION
Original Filed Feb. 17, 1964   3 Sheets-Sheet 3

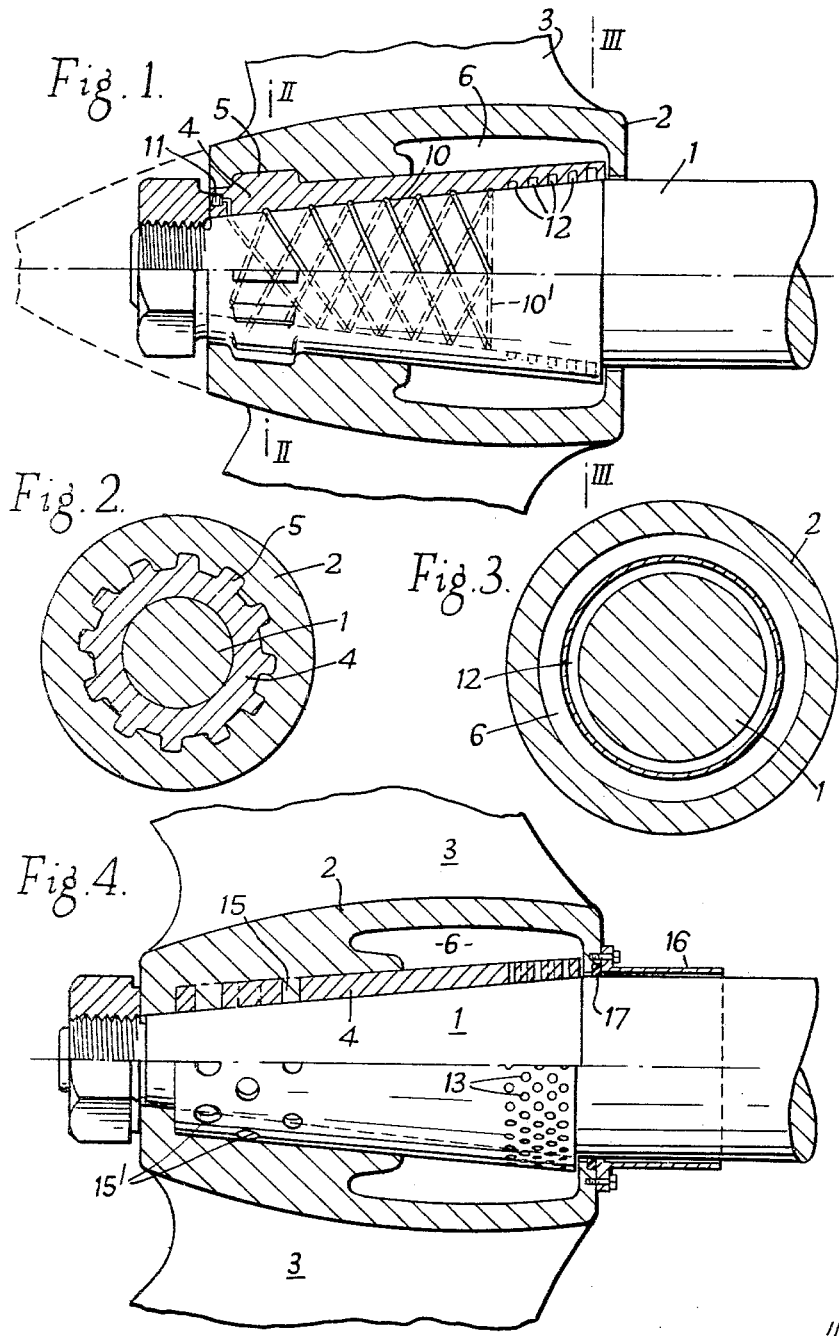

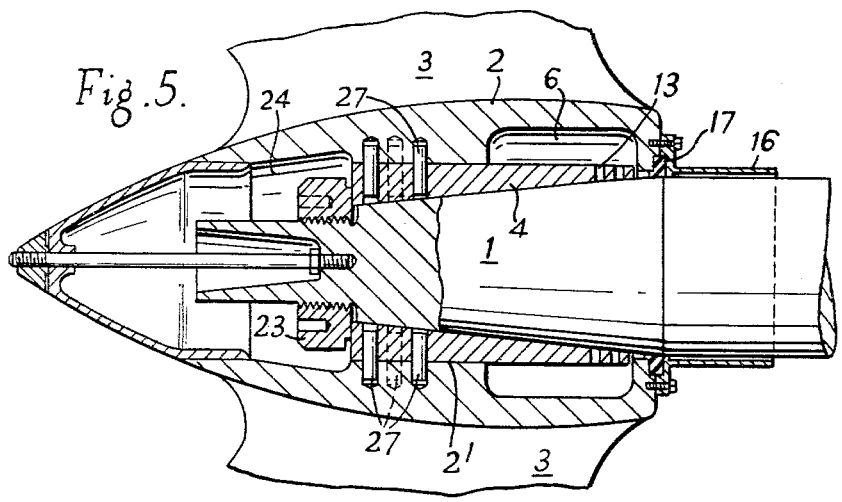
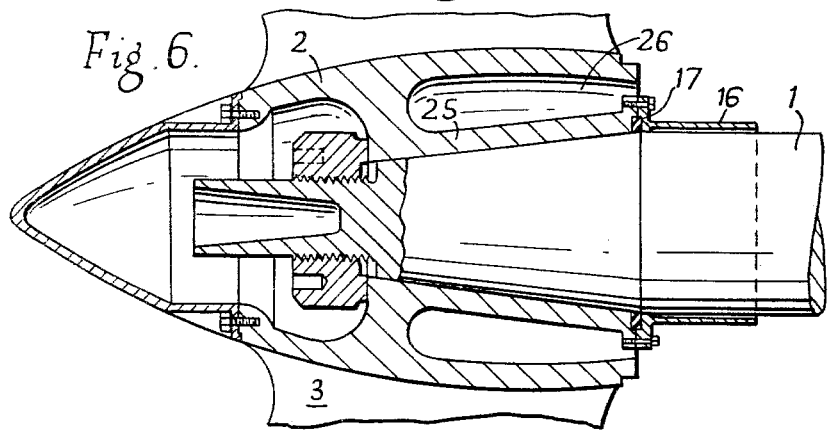
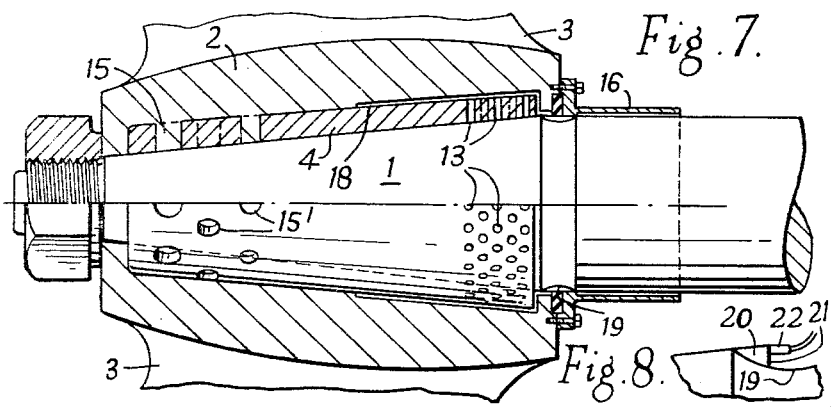

INVENTOR
Thomas W Bunyan
BY
Kenyon, Palmer, Stewart & Estabrook
ATTORNEYS

3,228,482
PROPELLER HUB AND SHAFT CONNECTION
Thomas Walter Bunyan, London, England, assignor to P & O Research and Development Co., Limited, London, England, a British company
Continuation of application Ser. No. 345,339, Feb. 17, 1964. This application July 19, 1965, Ser. No. 477,079
Claims priority, application Great Britain, Feb. 18, 1963, 6,540/63; Feb. 26, 1963, 7,681/63; Mar. 4, 1963, 8,491/63; May 15, 1963, 19,296/63
9 Claims. (Cl. 170—173)

This is a continuation of my co-pending application Serial Number 345,339 filed February 17, 1964.

The present invention relates to the mounting of ships' propellers and other bodies in torque or torque and thrust transmitting connection with a shaft.

The present day common methods of mounting bodies intended to be subjected to heavy loads, of which as a typical example may be mentioned ships' propellers, upon their driving shafts, e.g. by clamping engagement between the hollow boss or hub of the body and the surface of the shaft, the hollow boss or hub and the shaft commonly being of complementary conical formation, and such clamping engagement often being employed in conjunction with keys, have certain disadvantages amongst which a most serious is the liability to rapid deterioration in the fatigue strength of the assembly.

Of the factors which give rise to this disadvantage the most serious likely to be encountered are:

(a) Serious stress concentration due to the clamping stresses of the boss or hub or the body on the shaft and particularly in the case of a ship's propeller upon the usually coned or tapered end of the tail shaft.

(b) Occurrence of the form of metallic corrosion known as frettage or fretting due to the rigidity in torsion and bending of the boss or hub of the body and the consequent slip, usually progressive, between the boss or hub and the surface of the shaft upon reversals of the torque, e.g. as between "ahead" and "astern" running in the case of a ship's propeller, or due to torsional axial or bending vibration.

(c) The high stress concentration produced by the use of a key and key-way between the shaft and hub or boss of the body is often a source of very serious aggravation of the undesirable effects referred to above.

(d) Ships' propellers are usually of bronze. The coefficient of expansion of bronze is approximately 50% greater than that of steel and a propeller shrink-fitted to a shaft in the United Kingdom may become slack on the shaft when the ship reaches, say, the Persion Gulf or the Red Sea. A slack propeller seriously increases the generation of frettaged and particularly when combined with resultant hammering up of a keg and key-way, will almost invariably cause early failure of the tailshaft.

A combination of the factors described above—all inherent in the conventional cone or cone and key method of fastening ships' propellers, directly account for the present serious situation where every year some 20% of all tailshafts above 400 m./m. in diameter are casualties.

It is the object of the present invention to provide a form of assembly or mounting whereby the above described disadvantages are overcome.

In accordance with the invention there is provided a torque or torque and thrust transmitting assembly of a shaft and a propeller or other body mounted on the shaft, said assembly including a sleeve between the shaft and the hub or boss of the propeller or other body, or a sleeve-like portion of the hub or boss of the propeller or other body between the shaft and a main portion of the hub or boss of the propeller or other body, said sleeve or sleeve-like portion being in torque transmitting connection with the shaft, and the said boss or hub or the said main portion of the boss or hub being positively connected with or integral with the sleeve or sleeve-like part at or near one end of, or at a location between and spaced from the two ends of, the sleeve or sleeve-like portion, and the said boss or hub or the said main portion of the boss or hub having a clearance with reference to the sleeve or sleeve-like portion at at least the end thereof remote from said first-mentioned one end.

The invention further consists in an assembly of a shaft having a tapered end and a propeller mounted on said tapered end, said assembly including a metal sleeve between the tapered end of the shaft and the hub or boss of the propeller, or a sleeve-like portion of the hub or boss of the propeller between the shaft and a main portion of the hub or boss of the propeller, said sleeve or sleeve-like portion being in torque transmitting connection with the the tapered end of the shaft, torque transmitting engagement between the interior of the propeller hub or boss and the exterior of the sleeve or torque-transmitting connection between the sleeve-like portion and the main portion of the hub or boss of the propeller being over a circumferential zone or circumferential zones corresponding to a part only of the axial length of the hub or boss and spaced axially from the end thereof nearest the driving or larger end of the tapered end of the shaft, a clearance being provided between the sleeve and the hub or boss of the propeller or the sleeve-like portion and the main portion of the hub or boss of the propeller at the end adjacent to the larger end of the tapered end of the shaft.

In the case of ships' propellers mounted on tapered tail shafts, the sleeve or sleeve-like portion of the hub or boss is internally tapered and the torque transmitting connection between the sleeve or sleeve-like portion and the shaft end is usually a clamped connection achieved by shrinking of the sleeve or sleeve-like portion or by pulling-up the sleeve or the hub or boss including the sleeve-like portion onto the tapered tail shaft end. When the assemblies are to encounter temperature conditions which vary widely as between temperate and tropical waters, the separate sleeve may be preferred, the sleeve in such case being formed of the same metal as the shaft end, usually steel, or of a metal having a co-efficient of expansion substantially the same as that of the shaft end so that the clamping engagement between the sleeve and tail shaft will be maintained.

In the case of steel propellers the problem of differential expansion does not arise when fitted to a steel tailshaft and the sleeve like portion forming an integral portion of the hub or boss may be used. In the case of a bronze propeller fitted to a steel tailshaft, the initial interference fit must be such as to provide sufficient residual grip under the worst conditions of differential expansion such for example as could be met in the case of a propeller fitted in a sub-zero climate and the ship later operating in tropical waters. An initial interference of .001" per 1" shaft diameter would be necessary to allow for a .0003" loss of fit due to differential expansion. The use of the sleeve or sleeve-like elements in the connection would enable this to be achieved, whilst this is a practical impossibility with a solid hub.

The superior fatigue strength of an assembly according to the invention has been proved by fatigue testing a number of 3" diameter model shafts mounted with model propeller hubs. The models have been subjected to combined elevated stresses in torsion and bending from $10^7$ to $10^8$ stress cycles without failure.

These tests have demonstrated that by the use of the invention the fatigue strength of the propeller tailshaft assembly is approximately trebled.

The following reasons are given as an explanation of the improvement:

(a) The serious stress concentration effects of the usual single key and key-way have been eliminated in some cases by the use of a multiplicity of driving keys or dowels in uniform distribution circumferentially around the axis of the hub or boss and sharing the load equally by virtue of their distribution.

(b) The localised stress-raising effects in torsion and bending resulting from the heavy clamping stresses at the driving end of a directly mounted conventional solid boss are significantly reduced as the form and mounting of the leading end of the sleeve or sleeve-like portion of the hub or boss of a propeller ensures a gradual take-up of the torsional and bending strains from the tailshaft without discontinuity.

(c) The co-efficient of friction between a steel sleeve when used and the steel shaft is greater than between a steel shaft and a bronze hub or boss.

(d) The loss of shrink caused by the differential expansion effects as between bronze and steel is eliminated if a steel to steel shrink between a steel sleeve and a steel shaft is used. Where a steel shaft and sleeve-like portion of bronze is used then an increased initial interference fit must be employed to allow for the reduction in the co-efficient of friction and loss of shrink in environments hotter than that in which the assembly was initially made. This increase in the shrink from .00055" to .00085" per 1" diameter of shaft is obtainable with the sleeve-like portion but is for practical purposes impossible with a conventional solid boss.

(e) Sufficient pull up at ambient temperature of the propeller onto the tailshaft cone is now a practical proposition with the sleeve or sleeve-like portion according to the invention but is not the case with a solid hub without the highly undesirable application of heat which renders dismantling of the propeller a very difficult and uncertain operation. Static tests on the models showed that it was possible to yield the shaft in torsion or bending without any measurable slip between the steel sleeve and the shaft.

A number of embodiments of the invention are illustrated diagrammatically and by way of example in the accompanying drawings in which:

FIGURE 1 is a view in sectional elevation of one form of an assembly according to the invention as applied to the mounting of a ship's propeller, the upper and lower halves of the figure being taken in different planes.

FIGURE 2 is a sectional view taken on the line X—X of FIGURE 1.

FIGURE 3 is a sectional view taken on the line Y—Y of FIGURE 1.

FIGURE 4 is a view generally similar to FIGURE 1 of a first alternative form.

FIGURES 5, 6 and 7 are views again generally similar to FIGURE 1 and showing further alternative forms.

FIGURE 8 shows a detail of FIGURE 7.

The same or equiavlent parts are indicated by the same reference numbers throughout all figures of the drawings.

Figure 10:
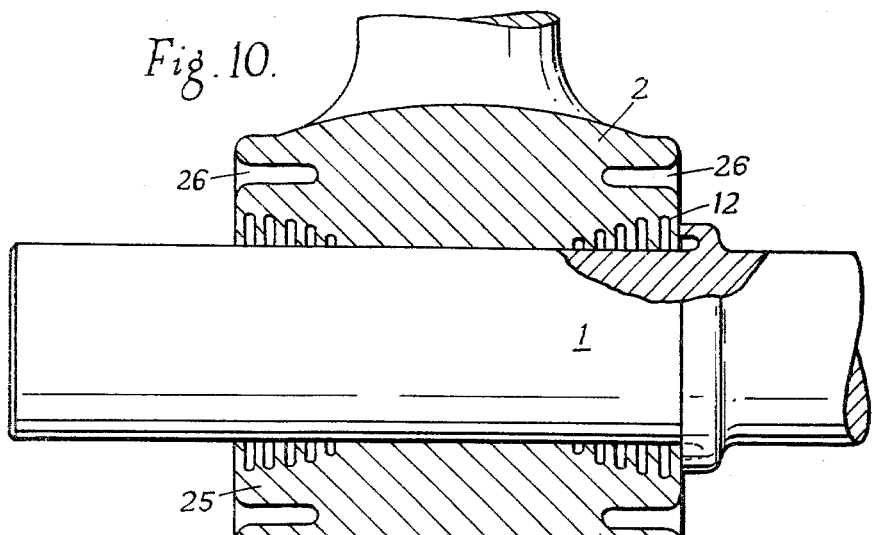
FIGURE 10 is a view in sectional elevation showing the invention as applied to the mounting of a wheel upon an axle.

Referring to FIGS. 1 and 2, 1 is the tapered end of a propeller tail shaft, usually of steel, and 2 is the tapered hollow hub or boss of a bronze propeller 3. Between the tapered end 1 of the shaft and the hub or boss 2 of the propeller is a tapered sleeve 4 of high duty cast iron or cast or forged steel having cast, machined or welded upon its external surface an array of steel key bars 5 (FIG. 2) located in this case in a circumferential zone, in the region of the after and smaller end of the length of the sleeve 4.

The sleeve 4 is located in the propeller hub or boss 2 e.g. by mounting the sleeve in the mould in which the propeller 3 is to be cast. Conveniently, the thickness of the sleeve 4 may be .12 x the sectional diameter of the shaft at any part of the taper portion 1, this being sufficient to ensure an adequate safety factor on torque and thrust when the sleeve 4 is pushed up the cone, such as a $\frac{1}{12}$ cone, an amount corresponding to .0065" per inch diameter at the larger end of the cone.

Annular recesses 6 may be formed in the interior of the hub or boss 2 for the purpose of reducing the weight and cost.

The hub 2 is out of contact with the sleeve 4 for approximately half the axial length of the sleeve at the forward larger end so that the sleeve is allowed to take up its torsional and flexural strains without interference from the heavy hub or boss of the propeller this being of prime importance in reducing local stress concentrations.

In order to further reduce the stress concentration effects while retaining the full grip necessary to eliminate frettage, the forward part towards the larger end of the sleeve 4 is machined internally with a number of axially spaced circumferential grooves 12 (FIG. 3) these grooves being of reducing depth in the direction from the larger towards the smaller end of the sleeve. The portions of the sleeve 4 between the grooves 12 in contact with the shaft—which may be seen as the equivalent of a series of rings of the full thickness of the wall of the sleeve, therefore exert the full radial pressure on the shaft, are torsionally stiff but will accommodate without slip the applied strains in the axial direction arising from bending deflection of the shaft. It is these strains which have been proved by testing to cause frettage wih a rigid hub or boss. The grooves 12 may be filled with iron cement or other rigid material to provide support for the lips of the grooves during force fitting or on demounting of the propeller. A similar result can be achieved by drilling an array of staggered holes in the sleeve near the larger end thereof as shown for example at 13 in FIGURE 4, 5 and 7, producing similar "softening-up" whilst retaining the radial gripping pressure as with the grooves 12 of FIGURE 1.

Since the co-efficient of expansion of bronze is greater than that of steel the boss or hub 2 will be a heavy shrink on to the steel sleeve 4 on cooling down after casting. The steel sleeve 4 however has a similar co-efficient of expansion to that of the steel shaft 1. It will readily be seen therefore that when the propeller is mounted the original interference fit produced between the sleeve 4 and the cone 1 by the push up on the cone 1 by .0065"/1" D will remain unchanged whatever change in sea-water temperature may be encountered. The interference fit between the bronze boss or hub 2 of the propeller 3 and the sleeve 4 will be reduced in tropical waters, e.g. a third of the shrink fit may be lost but this is of little consequence as the drive is not being taken by virtue of such fit but is direct through the key bars 5.

In certain applications—such as in the case of hubs for gear wheel or shafts or railway carriage wheels on axles—it may be preferable for the keys or dogs 5 to be situated at mid-length of the sleeve 4.

In order to facilitate removal of the propeller 3 from the shaft 1, a series of shallow helical grooves 10 are machined in the bore of the sleeve 4. These grooves connect with two or more screw threaded apertures, one only of which is shown at 11 in FIGURE 1, at the after end of the sleeve 4, to which a high pressure oil or grease gun can be attached in screwed connection. All the helical grooves 10 are connected together at a common circumferential groove 10' at their forward end. Upon application of pressure in one helical groove 10 air will be driven out through the other helical groove or grooves 10, and thereafter oil or grease pressure may be applied at all the threaded apertures 11 to expand the sleeve 4 and the hub to permit removal of the propeller from the shaft end 1.

The construction shown in FIGURE 4 is similar to that shown in FIGURE 1 with the exception that cast dowels 15 integral with the hub 2 and extending into holes 15′ bored in the sleeve 4 near its after end are used in place of the key bars 5 at or near the small end of the sleeve 4.

The dowels 15 and holes 15′ are preferably arranged in a plurality of circumferential rows and in staggered relation as between adjacent rows and the holes 15′ and their dowels may be of decreasing size as shown, in the direction from the small end towards the larger end of the sleeve.

A sleeve 16, which may be part of the well known "simplex" oil seal is applied about the shaft 1 at the larger end of the hub 2 and serves to retain a rubber sealing ring 17 against the forward end of the hub 2 which surrounds the shaft 1 with clearance.

The construction shown in FIGURE 5 is in general similar to that of FIGURE 1 but is particularly suitable for application to existing propellers having the hitherto normal solid hub or boss.

In this case the hub or boss 2 is machined internally to a form as shown and a sleeve 4 of wall thickness tapering downwards in the forward direction, applied inside the machined hub boss with a shrink fit between a part 2′ of the length of the boring in the hub 2 and the rearwards and thicker end of the sleeve 4, and secured by dowel pins 27 extending through the wall of the sleeve 4 and into holes in the hub or boss.

The hubs or bosses of new propellers may also be given the hollow construction shown in this figure and it is possible to use a shorter tail shaft with this construction and the propeller retaining nut 23 may be located within a recess 24 at the rear end of the hub or boss.

In FIGURE 6 there is shown a construction in which the stress relieving member instead of being constituted by a separately formed sleeve 4 as in the previously described constructions comprises a sleeve-like portion 25 of the hub or boss 2 itself, i.e. the hub or boss and stress relieving member are integral.

The sleeve-like portion 25 is produced by casting or machining an annular recess 26 in the hub or boss 2 extending from the forward end of the hub or boss and extending in the case shown in FIGURE 6 over a major part of the axial length of the tapered portion of the tail shaft 1.

This construction offers advantage from the point of view of cost of production in the case of a bronze propeller on a steel shaft but does not provide the immunity from the effects of differential expansion provided by the use of the steel sleeves 4 previously described.

In such case if differential expansion is to be encountered the interference fit between a bronze propeller hub or boss 2 and a steel shaft 1 must be increased from a drive-up of .0065″/1″ to .010″/1″ (given a shaft taper of $\frac{1}{12}$).

On the other hand the construction of FIGURE 6 is well adapted for use with cast iron or steel propellers or with built up propellers having cast iron or steel hubs or bosses, to be mounted on steel tail shafts.

The construction shown in FIGURE 7 is in general similar to that of FIGURE 4 the hub or boss 2 however in this case being almost solid about the cast-in sleeve 4, the necessary torsional and transverse freedom between the hub or boss 2 and the sleeve 4 over the forward approximately half portion being provided by a cored-out or machined shallow annular groove 18 provided around the sleeve 4. This groove 18 may be formed either by wrapping an asbestos tape or other refractory flexible material around the sleeve 4 before casting the hub or boss or alternatively the necessary clearance around the sleeve 4 corresponding to the groove 18 may be obtained by plastically deforming the forward part of the sleeve by intense local heating over the approximate half length— this being done before machining the bore of the sleeve 4.

A shallow circumferential groove 19 is shown as being turned in the surface of the tailshaft in the region of the forward end of the sleeve 4. This groove 19 acts as a stress diffuser geometrically deflecting the flow of stress lines away from the leading edge of the sleeve the "stress lines" turning radially outward from the shaft into the sleeve in an axially diffused pattern for both torsion and bending.

The groove 19 shown on a larger scale in FIGURE 8 also facilitates carrying out ultrasonic examination of the shaft surface for cracks or flaws. Such examinations can be carried out utilising a metal block 20 accurately shaped for bedding in the groove 19 and so as to present a radial face 21 perpendicular to the axis of the shaft 1 which face may be engaged by an ultrasonic probe 22 enabling the condition of the shaft surface to be examined without the necessity for removal of the propeller from the shaft.

Figure 9:
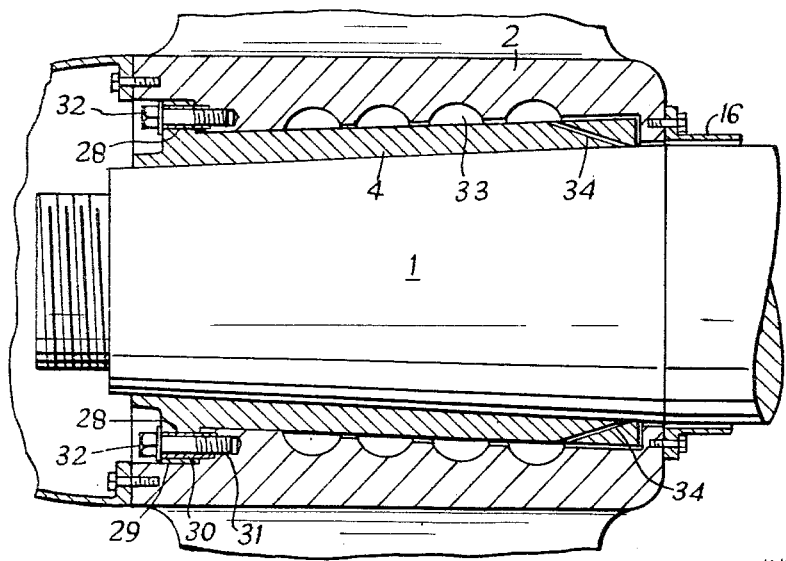
FIGURE 9 is a view generally similar to FIGURE 1 showing a further modified embodiment.

FIGURE 9 illustrates a further example of the invention as applied to a propeller mounting employing the separate sleeve 4 but which avoids the need for casting the propeller or the hub or boss 2 of the propeller about the sleeve.

In this case the steel sleeve 4 is formed with an integral radial flange 28 at or near its smaller end. The bore of the bronze boss or hub is machined to give a running clearance on the sleeve 4 with the boss or hub 2 and the sleeve at a temperature of about 90° F.

The flange 28 of the sleeve 4 and the adjacent end of the boss or hub 2 are drilled at circumferentially distributed points as shown at 29 to take shear sleeves 30 which are a driving fit, the holes in the boss or hub being further bored and tapped as shown at 31 to receive bolts 32 securing the sleeves 30.

Annular passages 33 may be formed in the interior of the hub or boss 2 to save unnecessary weight and the corresponding cost of bronze and an oil hole such as 34 may in some cases be provided through the large end of the sleeve 4 to give passage for oil from the interior of the sleeve 16 of an orthodox "simplex" oil gland to the clearance space between the forward part of the sleeve 4 and the hub or boss 2.

The arrangement shown in FIGURE 10 illustrates a particular application of certain of the stress relieving features described with reference to FIGURE 1 and in conjunction with the combined sleeve-like portion of FIGURE 6 as applied to the problem of bending fatigue failure commonly experienced in railway vehicle axles. Railway vehicle wheels are usually shrunk onto the axle. In FIGURE 10 the wheel hub or boss 2 is shown as provided with deep axially directed annular stress diffusing grooves 26 turned or trepanned parallel to the centre line XX of the hub or boss. A series of axially spaced circumferential grooves 12 of decreasing depth in the direction from the ends towards the centre of the hub or boss are provided in each cheek of the hub. In the case of srunk-on hubs, the grooves 12 are unfilled but where force-fitting of the hub on the axle is employed it may be advantageous to fill the grooves e.g. with iron cement.

The construction used in practice in any particular embodiment may of course employ any of the individual features described with reference to any figure of the drawings with any individual feature described with reference to any other figure of the drawings depending on the nature of the embodiment, the materials available for use in its construction and the manufacturing facilities available.

I claim:
1. A propeller mounting comprising:
   a shaft having a tapered end;
   a metal sleeve member mounted on the tapered end of said shaft in torque transmitting connection with said shaft;
   a propeller including a hub enveloping said metal sleeve member, in rigid torque and thrust transmitting connection with said metal sleeve over a circumferential zone in the region of the end of said hub adjacent a smaller end of said tapered shaft and of an axial length corresponding to a part only of the axial length of said hub, and with an axially elongated annular clearance space between said metal sleeve member and said hub extending from said circumferential zone to the end of said hub adjacent the larger end of said tapered shaft;

whereby stress concentrations in the area of the large end of the tapered portion of the shaft which otherwise cause failure of the shaft in that area are substantially eliminated.

2. An assembly as claimed in claim 1 and wherein said sleeve member is formed of a metal having substantially the same co-efficient of expansion as the metal of the shaft in clamped connection with the tapered end of the shaft by pulling-up the sleeve on the shaft.

3. A propeller mounting as claimed in claim 1 and including torque and thrust transmitting keys in circumferential distribution in a circumferential zone between the end of said metal sleeve member adjacent the smaller end of said tapered shaft and the end of said hub adjacent the smaller end of said tapered shaft.

4. A propeller mounting as claimed in claim 1 wherein the torque and thrust transmitting connection between said metal sleeve member and said hub in said circumferential zone comprises means defining radial holes in said metal sleeve member and dowels integral with said hub and cast-in in said radial holes.

5. A propeller mounting as claimed in claim 1 wherein the torque and thrust transmitting connection between said metal sleeve member and said hub in said circumferential zone comprises means defining aligned radially disposed openings in said metal sleeve member and said hub and dowels disposed from the interior through said holes in said sleeve member and into said holes in said hub.

6. A propeller mounting as claimed in claim 1 wherein the torque and thrust transmitting connection between said metal sleeve member and said hub in said circumferential zone comprises an outwardly directed flange on said metal sleeve member at the end thereof adjacent the smaller end of said tapered shaft and axially directed bolts extending through said flange and into the end of said hub adjacent the smaller end of said tapered shaft.

7. A propeller mounting comprising:
a shaft having a tapered end;
a propeller including a hub mounted on said tapered end of said shaft, said hub having an elongated annular slot coaxial with said shaft and extending axially from the end of said hub adjacent the larger end of said tapered shaft over a substantial part of the axial length of said hub, said hub being mounted with its inner surface including the inner surface of the annular slotted portion thereof in torque and thrust transmitting surface engagement with the surface of said tapered end of said shaft;

whereby stress concentrations in the area of the large end of the tapered portion of the shaft which otherwise cause failure of the shaft in that area are substantially eliminated.

8. A propeller mounting as claimed in claim 1 wherein said metal sleeve member is provided at the end of its interior surface adjacent the larger end of said tapered shaft with a plurality of axially spaced circumferential slots.

9. A propeller mounting as claimed in claim 1 wherein said metal sleeve member is provided at the end of its interior surface adjacent the larger end of said tapered shaft with a plurality of axially spaced circumferential slots, said slots being of decreasing depth in the direction axially inwards of said sleeve away from the larger end of said tapered shaft.

References Cited by the Examiner

UNITED STATES PATENTS

| | | | |
|---|---|---|---|
| 1,836,989 | 12/1931 | Reed | 170—159 |
| 2,146,342 | 2/1939 | Koyemann | 170—173 |
| 2,840,399 | 6/1958 | Harless et al. | 287—53 |
| 3,097,003 | 7/1963 | Deve et al. | 287—53 |
| 3,136,370 | 6/1964 | Carlson | 170—173 |
| 3,144,909 | 8/1964 | Hart et al. | 170—173 X |

FOREIGN PATENTS

| | | |
|---|---|---|
| 616,293 | 10/1926 | France. |
| 366,939 | 1/1939 | Italy. |

SAMUEL LEVINE, *Primary Examiner.*

E. A. POWELL, JR., *Assistant Examiner.*